(12) United States Patent
Dempster et al.

(10) Patent No.: US 7,421,422 B1
(45) Date of Patent: Sep. 2, 2008

(54) METHOD FOR GRAPHICAL INTERACTION WITH GEOGRAPHIC DATABASES FOR INTERACTIVE BROADCAST PRESENTATION

(75) Inventors: Douglas G. Dempster, Andover, MA (US); Jeffrey Isaacs, Somerville, MA (US); William R. Dow, Jr., Newton, NH (US)

(73) Assignee: WSI Corporation, Billerica, MA (US)

( * ) Notice: Subject to any disclaimer, the term of this patent is extended or adjusted under 35 U.S.C. 154(b) by 239 days.

(21) Appl. No.: 10/406,695

(22) Filed: Apr. 3, 2003

Related U.S. Application Data

(60) Provisional application No. 60/370,862, filed on Apr. 8, 2002.

(51) Int. Cl.
*G06F 17/30* (2006.01)

(52) U.S. Cl. ............... 707/2; 707/3; 707/4; 707/10; 707/102; 707/104.1; 702/3

(58) Field of Classification Search ............. 702/200, 702/300, 400, 2, 3; 709/200, 204; 715/700; 707/104.1, 3, 1, 200; 345/473
See application file for complete search history.

(56) References Cited

U.S. PATENT DOCUMENTS

| | | | | |
|---|---|---|---|---|
| 5,568,385 A | * | 10/1996 | Shelton | 702/3 |
| 5,583,972 A | * | 12/1996 | Miller | 345/419 |
| 5,848,378 A | * | 12/1998 | Shelton et al. | 702/3 |
| 5,940,776 A | * | 8/1999 | Baron et al. | 702/4 |
| 6,240,369 B1 | * | 5/2001 | Foust | 702/3 |
| 6,285,347 B1 | * | 9/2001 | Watanabe et al. | 345/684 |
| 6,339,747 B1 | * | 1/2002 | Daly et al. | 702/3 |
| 6,384,830 B2 | * | 5/2002 | Baron et al. | 345/473 |
| 6,496,780 B1 | * | 12/2002 | Harris et al. | 702/3 |
| 7,036,085 B2 | * | 4/2006 | Barros | 715/764 |
| 7,158,151 B2 | * | 1/2007 | Asami | 345/419 |
| 2001/0049584 A1 | * | 12/2001 | Jones et al. | 702/3 |
| 2006/0125828 A1 | * | 6/2006 | Harrison et al. | 345/441 |

* cited by examiner

*Primary Examiner*—Shahid A Alam
*Assistant Examiner*—Rezwanul Mahmood
(74) *Attorney, Agent, or Firm*—Woodcock Washburn LLP

(57) ABSTRACT

Methods and systems for providing random access, interactive presentations of geographic and temporal information for a region of interest. The system includes a database that receives and stores geographically registered data, an input system that receives parameter inputs, a data processor, and a visualization system that generates graphical representations of the geographically registered data for visual display. As parameters are interactively received via the input subsystem, a query of the geographically registered data is created, and the results of the query are returned to the visualization system such that the graphical representations are displayed in substantially real-time in accordance with the results.

41 Claims, 5 Drawing Sheets

METHOD FOR GRAPHICAL INTERACTION WITH GEOGRAPHIC DATABASES FOR INTERACTIVE BROADCAST PRESENTATION

CROSS-REFERENCE TO RELATED APPLICATIONS

This application claims the benefit of priority of U.S. Provisional Application No. 60/370,862, filed Apr. 8, 2002.

FIELD OF THE INVENTION

The present invention generally relates to the field of information presentation systems. More particularly, the present invention relates to a system and method of near real-time, interactive presentation of random access, geographic and temporal information.

BACKGROUND OF THE INVENTION

Conventional video and graphic presentation systems used for, e.g., weather forecasting and traffic information broadcasts, require advance preparation of the visual presentation. This method is limited in that when newscasters are called upon to present information regarding fast moving storms, urgent situations, etc., the information being presented to viewers is not the most current available. While newscasters may endeavor to present current information, their graphical presentation may be 15 minutes old, or older, and the conditions sought to be presented may have changed in the interim.

Another problem with conventional systems is that they are not interactive. This inflexibility does not allow for changes during the airing of the presentation. Thus, if something should change between the preparation of the broadcast and airtime, or if the newscaster should decide at airtime that he or she would like show something different or further detail a portion of the display, the newscaster cannot interactively change the presentation and must prepare a new broadcast presentation, which often is not possible due to time constraints.

Thus, in view of the foregoing, there is a need for systems and methods that overcome the limitations and drawbacks of the prior art. In particular, there is a need for a system that provides real-time, interactive presentation of information. The present invention provides such a solution.

SUMMARY OF THE INVENTION

The present invention is directed to methods and systems for providing random access, interactive presentations of geographic information for a region of interest. The system includes a database that receives and stores geographically registered data, an input system that receives parameter inputs, a data processor, and a visualization system that generates graphical representations of the geographically registered data for visual display. As parameters are interactively received via the input subsystem, a query of the geographically registered data is created, and the results of the query are returned to the data processor and then to visualization system such that the graphical representations are displayed in substantially real-time in accordance with the results.

In accordance with the present invention, the geographically registered data may include temporal characteristics, such that the data is dynamic over time. The geographically registered data may include gridded data, discreet position data, and geographic region data. A query of the database invokes an interpolation, closest match, intersecting point process or other algorithm to retrieve the results.

In accordance with another feature of the invention, the visualization system generates graphical representations of geographic information for display on broadcast television, cable or other broadcast media. Also, the visualization system may provide a datastream communicated over the Internet or other wide area network. The visualization system may generate graphical avatars that have characteristics that change over time based on data received in the database. The avatars may change in real-time in response to the data in the database.

In accordance with yet another feature of the invention, the geographically registered data may include weather data, such as temperature, conditions, wind speed and direction, weather advisories, watches and warnings, radar and satellite data, and predicted storm and hurricane paths.

In accordance with another aspect of the invention, there is provided a method of presenting random access, geographic and temporal information for a region of interest. The method includes receiving geographically registered data at a database; interactively receiving parameter inputs; formulating a query of the geographically registered data in the database in response to the parameter inputs; and graphically presenting the results of the query.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention is directed to a system for providing near real-time, random access, interactive presentation of geographic and temporal information for a location or region of interest. The system of the present invention allows newscasters to come on the air and interactively generate visual displays to convey weather and other information to viewers without the need to prepare the visual display in advance of airtime.

Figure 1:
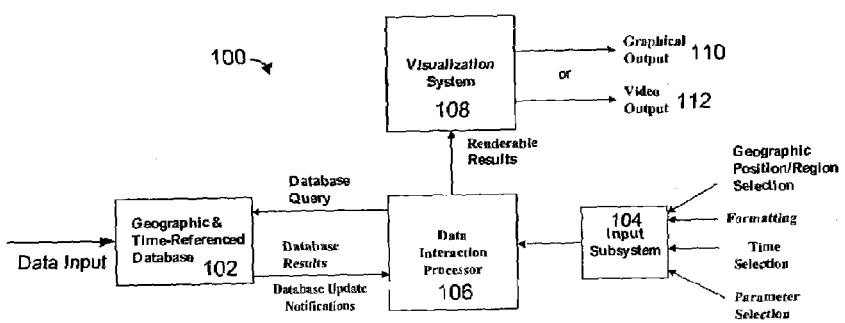
FIG. 1 is a block diagram illustrating an overview of the system of the present invention.

Referring now to FIG. 1, there is illustrated an overview of the system 100 of the present invention. A geographic and time-referenced database 102 includes data that is geographically registered, such as weather or traffic information. The data may also include temporal characteristics, such that it is dynamic over time. The database 102 may include, but is not limited to, information about temperature, weather conditions (e.g., precipitation type and rate, lightning strikes, etc.), wind speed and direction, weather advisories, watches and warnings, radar and satellite data, predicted storm and hurricane paths, etc., for many geographic regions of interest. The database 102 regularly receives an input of such geographically registered data (shown as data input in FIG. 1). The database 102 may be populated with information provided by the National Weather Service, real-time sensors, computer models, visual observations, etc.

In accordance with the present invention, the database 102 stores three types of data. The first is gridded data, which is a rectangular array of parameters such as temperature. The second type of data is discreet position data, which are parameters for one or more specific geographic locations, preferably stored by latitude/longitude. Examples of such data are an automated weather sensor, the location of an accident report in a traffic database, or the position of a lightning strike sensed by a lightning detector. The third type of data is geographic region information, which are parameters for a region described by a geographic outline, such as for a county or for a National Weather Service (NWS) zone.

Depending on the type of the parameter to be stored in the database 102, it would be stored in one of above representations. During a query, based on the type of parameter selected, a different algorithm may be used for each of these data storage types to return the selected value. For example, for gridded data, a simple linear interpolation may be used to return the selected value. For the point information, a "closest match" to the queried geographic position may be returned. For the regional information, a linear search of all the current information may be performed to find whether one of the records "intersected" with the queried point or region. Other algorithms may be used to determine the data value to return the selected value.

Figure 2:
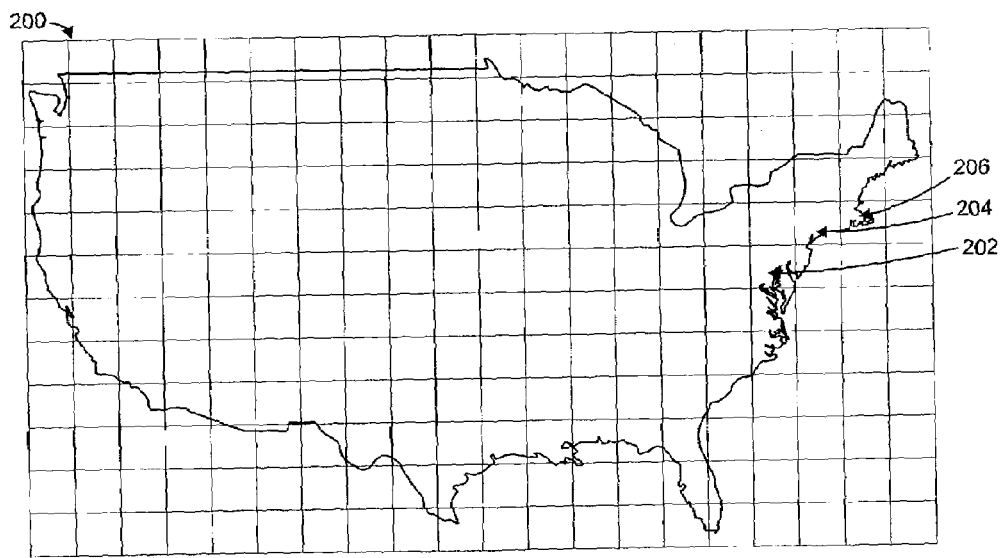
FIG. 2 illustrates the grid-based storage of data within the database of the present invention.

FIG. 2 illustrates how this data may be stored and registered to geographic regions of interest. A geographic region (e.g., the United States) may be broken down into a grid 200 of data points, wherein each square region in the grid 200 contains information relevant to the particular geographic location. It is noted that the square regions are provided for exemplary purposes only, as other shaped regions may be used. In particular, NWS data is often broken down into regions defined by county lines.

As illustrated, region 202 contains information relevant to the Baltimore/Philadelphia areas, region 204 contains information about the New York/Connecticut area, and region 206 contains information about the Rhode Island/Boston area. It is noted that FIG. 2 has been provided merely for illustrative purposes as the grid 200 may have greater or lesser resolution than illustrated in FIG. 2. For storing weather-related data, it is preferable that each region coincide with a National Weather Service Zone, and/or a county or a state depending on the type of weather information being stored in the database 102. Further, the data stored therein may be referenced to a particular layer or layers of the atmosphere. Thus, box 202 may contain a numeric coded representation of the weather in the Baltimore/Philadelphia region such that when the database 102 is queried for inform about the region, it will return the coded representation, which in turn will be converted into a graphical representation of the weather, as described below.

Referring again to FIG. 1, an input subsystem 104 is provided to receive input from a user, such as a geographic position/region selection, formatting inputs, a time selection, and a parameter selection (e.g., weather, traffic, warnings, current observations, etc.). The user input may come from a personal computer running the appropriate software to generate inputs that may be received and processed by the system 100 via a data interaction processor 106. For example, this input may come from the user via a mouse, a typed command at a keyboard, or from an interactive device such as a computer touch screen.

The user inputs may include, but are not limited to, a selection of one or more parameters that are to be extracted from the underlying geographic database 102. The inputs may specify to the processor 106 a specific time or a time range for which the database is to be queried, or a geographic position or region for which the data is to be queried in accordance with the user input. Formatting may be specified that indicates how information is to be displayed. The formatting may include a representation format (e.g., textual versus iconic), and graphical attributes such as font or line width. Given these inputs, the data interaction processor 106 performs a query of the database 102, formats the information based on the selected format specification, and presents the results to a visualization system 108 for presentation.

The visualization system 108 for this system 100 can be any computer graphics system capable of generating graphical representations of geographic information such that that representation can be displayed on broadcast television, cable or other broadcast media. An example of such a system is the TrueView System provide by WSI Corporation, Billerica, Mass. The visualization system 108 is graphical in nature and presents, e.g., a map of a particular geographic area and turns coded information extracted from the database 102 via the data interaction processor 106 into a graphical display. For example, temperature data may be input to the visualization system 108, which in turn is output as a picture of a thermometer indicating the temperature. The visualization system 108 includes both video and graphical outputs 110 and 112, which may be used for broadcast television, or to provide a datastream communicated over the Internet or other wide area network for use by visitors to websites (e.g., personal computers running Web Browsers and/or Flash players, etc.).

Figure 3:
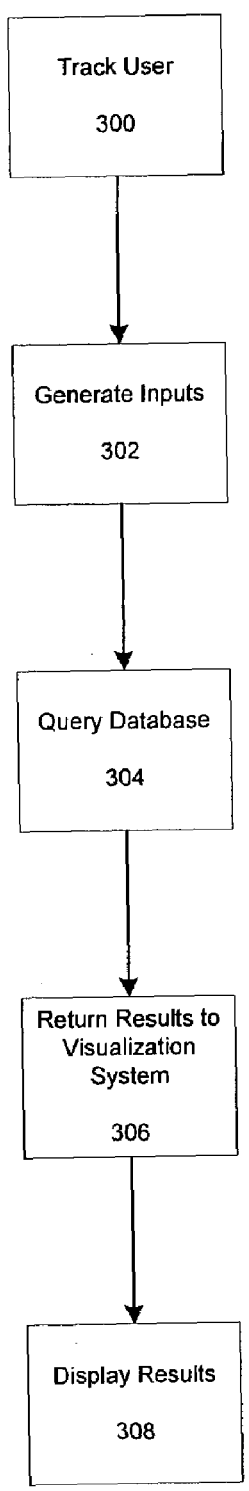
FIG. 3 is a flowchart illustrating the processes performed by the present invention to provide interactive presentation of data.

FIG. 3 provides a flowchart of the operation of the system 100. In operation, the system 100 may take user input from a visual tracking device, as known in the art, to track, e.g., the user's finger (step 300). For example, the user may point to a particular geographic location to obtain the current temperature at that location. The data interaction processor 106 receives the input from the input subsystem 104 (step 302), and formulates the appropriate query of the database 102 (step 304). The database 102 returns the result of the query to the data interaction processor 106, which sends the result to the visualization subsystem 108 (step 306). In accordance with the present invention, the query returns the latest available information regarding the information requested by the query. The results are then output via graphical or video outputs 110 and 112 for broadcast or transmission (step 308). It is noted that steps 300-308 are performed in near real-time such that when a newscaster points to a particular location, the requested data is substantially immediately presented for display, without the need for preparing the broadcast presentation in advance of air time. Thus, any data stored in the database 102 may be interactively presented.

Referring to FIGS. 4-9, there is illustrated exemplary presentations 400 generated by the system 100 that includes avatars 402, 404, 406 and 408. In this context, an avatar is a graphical object having characteristics that change over time based on data updates to the database 102, a change in geographic position, a change in the time of day for which the avatar is presenting information, etc.

Figure 4:
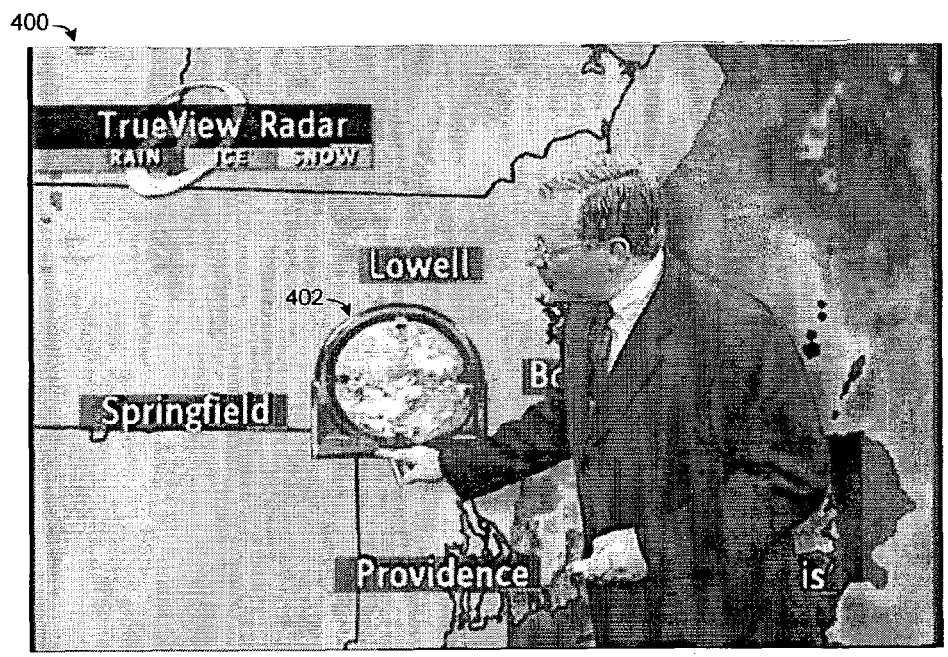
FIGS. 4-9 illustrate several exemplary graphical presentations and avatars in accordance with the present invention.
Figure 5:
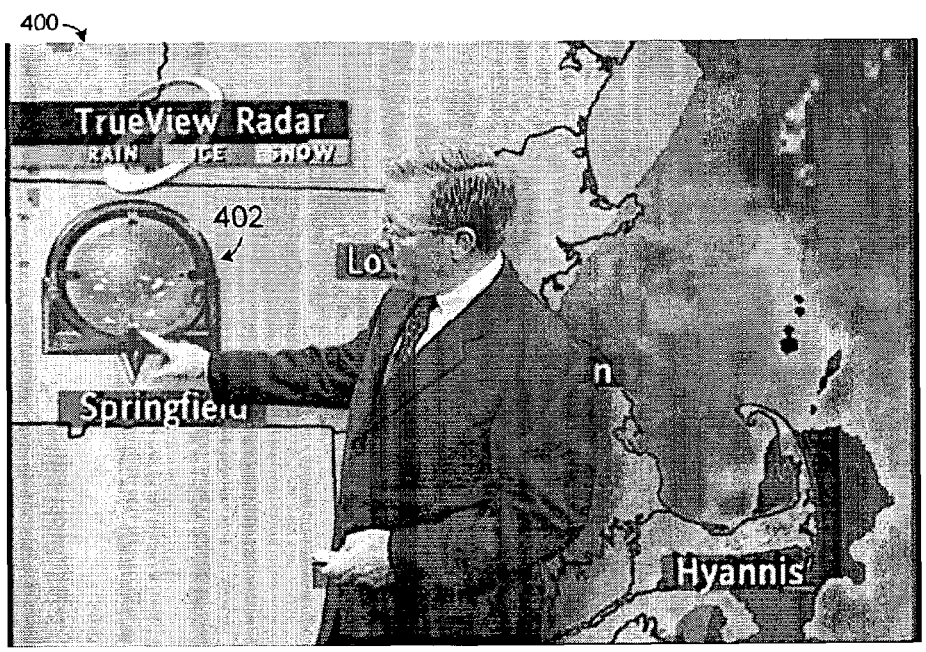
Figure 6:
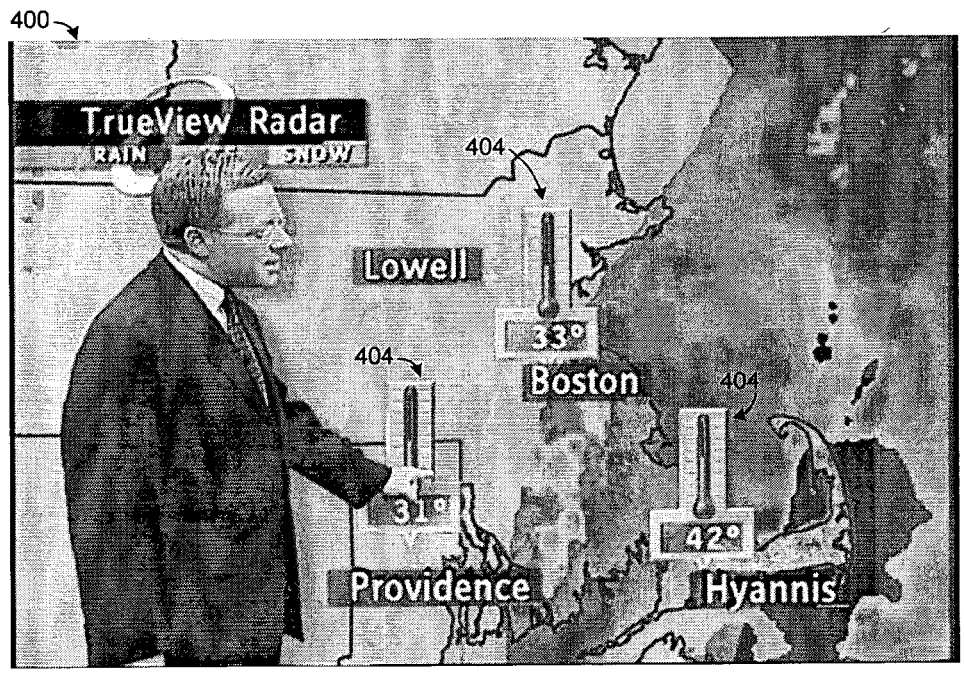
Figure 7:
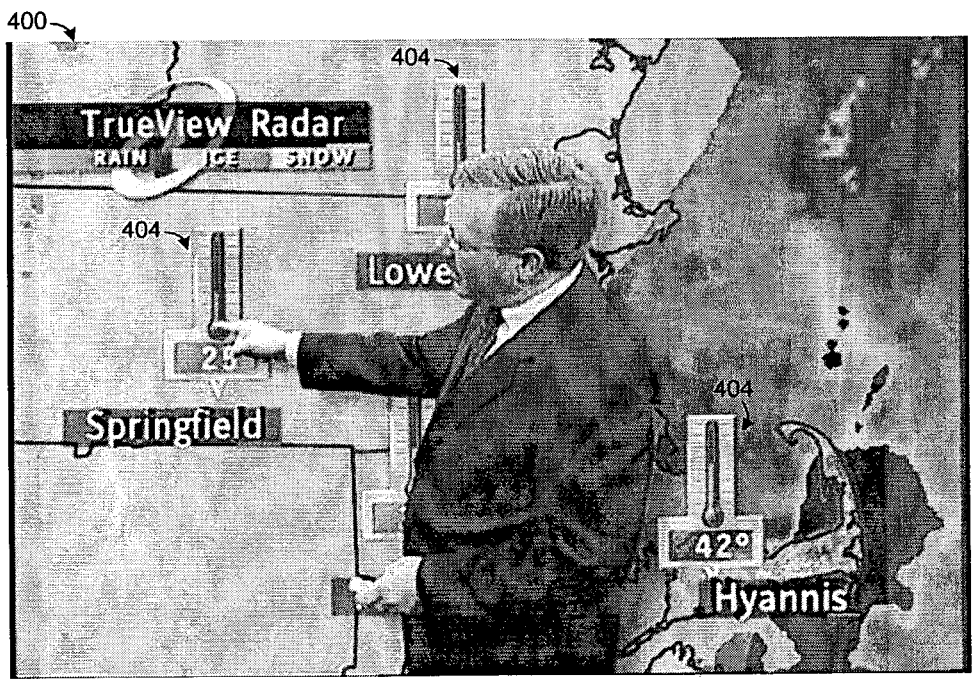

Examples of avatars include a window to show the weather conditions at a particular location at a particular time (see, e.g., avatar 402). As shown in FIG. 4, the avatar 402 is showing considerable snowfall, whereas in FIG. 5, there is only snow flurry activity displayed. As illustrated in FIGS. 6 and 7, another avatar 404 contains floating text that shows the temperature at various geographic positions. As the text is moved within a map display 400, the value of the avatar 404 changes to reflect the temperature at the new geographic position. Optionally, a "data time" slider may be provided that may change from, e.g., morning to noon. As the time changes, the text in the avatar 404 changes to reflect the recorded or forecast change in the temperature.

Figure 8:
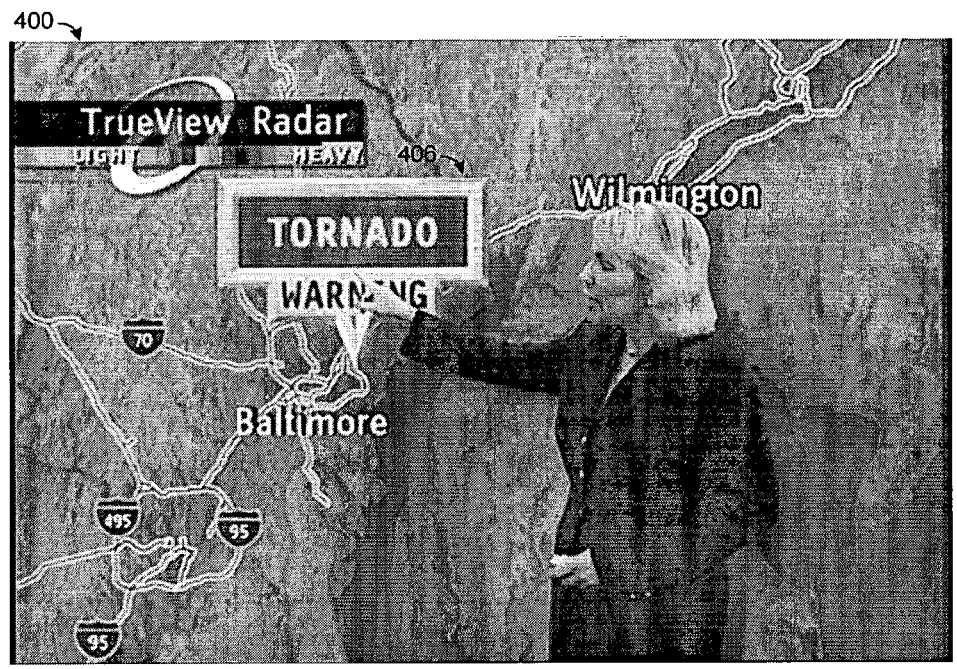
Figure 9:
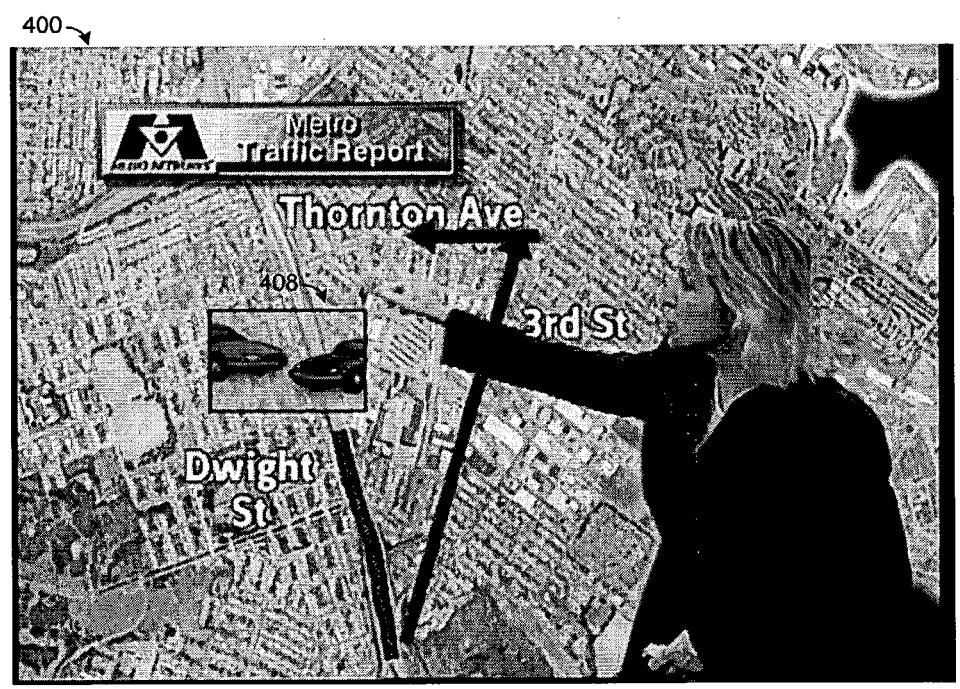

Referring to FIGS. 8 and 9, avatars 406 and 408 may be used to illustrate other events, such as warning information (FIG. 8) or traffic conditions (FIG. 9). Still further, an exemplary avatar (not shown) may be a rain gauge icon. When the avatar is dragged around the map display, the "water" inside the avatar is smoothly raised or lowered to show the difference in actual or forecast rain between two geographic positions. As a "data time" slider is changed, the water also animates to reflect the accumulation of precipitation for a specific geographic location.

Yet another avatar may be a small video clip of a golfer. When dragged to a place on the map where high winds are expected, the video clip shows the golfer putting on a windbreaker, and trees in the background begin to sway. When dragged from there to a place on the map where rain is expected, the golfer pulls out an umbrella, etc. The above avatars are provided as an exemplary set of visualizations, and are not intended to be a limiting set of all avatars as those of ordinary skill in the art will recognize that other visualizations are possible.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A system for providing random access, interactive presentations of geographic and temporal information for a geographic region of interest, comprising:
    a database that receives and stores geographically registered data;
    an input system that interactively receives real time geographic inputs;
    a data processor that dynamically creates a query of said geographically registered data in substantially real-time in response to receipt of said real time geographic inputs;
    a visualization system that generates graphical representations of said geographically registered data returned with results of said query for visual display, wherein said graphical representations of said results are displayed in substantially real-time; and
    a cursor that can be moved about said geographic region of interest using said input system; and
    wherein visual characteristics of said displayed graphical representations dynamically change in substantially real time in response to changes in position of said cursor in relation to said geographic region of interest,
    wherein said graphical representations comprise an avatar that can be positioned geographically at the location selected by the input system,
    wherein said avatar comprises a graphical representation of the weather for a position of said avatar,
    wherein said avatar can be dragged around a map displaying said geographic region of interest using said input system, and
    wherein a visual characteristic of said displayed avatar dynamically changes as said position of said avatar changes with respect to said geographic region of interest.

2. The system of claim 1, wherein said geographically registered data includes temporal characteristics, such that said data is dynamic over time, wherein visual characteristics of said displayed graphical representations are updated in real time to reflect said temporal characteristics of said geographically registered data in said database.

3. The system of claim 1, wherein said geographically registered data comprises at least one of gridded data, discreet position data, and geographic region data, and wherein a process is invoked on the data to retrieve said results.

4. The system of claim 1, wherein said input system further receives formatting inputs and a time selection, and wherein said formatting inputs include a representation input.

5. The system of claim 1, wherein said visualization system generates graphical representations of geographic information for display on broadcast and cable television.

6. The system of claim 1, wherein said visualization system provides a datastream communicated over a wide area network.

7. The system of claim 1, said avatar having characteristics that change over time based on data received in said database, and wherein said avatar changes according to updates of said data in real-time.

8. The system of claim 1, said avatar having characteristics that change based on a change to the avatar's geographic position or altitude.

9. A method for providing near real-time, random access, interactive presentation of weather information for a geographic region of interest, comprising:
    receiving geographically registered weather data at a database;
    randomly receiving a geographic position/region selection and a parameter selection;
    formulating one or more queries of said geographically registered weather data in response to said selections;
    interactively generating graphical representations of weather conditions for said region of interest in near real-time in response to results of said one or more queries;
    displaying said graphical representations of weather conditions for said region of interest;
    moving said graphical representations over said geographic region of interest using said input system; and
    dynamically changing a characteristic of said graphical representations based on a position of said graphical representations,
    wherein said graphical representations comprise avatars that can be positioned geographically at the geographic position/region selected by the input system,
    wherein each said avatar comprises a graphical representation of the weather for a position of said avatar, wherein said avatar can be dragged around a map displaying said geographic region of interest using said input system, and wherein a visual characteristic of said displayed avatar dynamically changes as said position of said avatar changes with respect to said geographic region of interest.

10. The method of claim 9, wherein said database includes at least one of information about temperature, weather conditions, wind speed and direction, weather advisories, watches and warnings, radar and satellite data, and predicted storm and hurricane paths.

11. The method of claim 9, wherein interactively generating graphical representations comprises generating avatars having characteristics that change over time based on weather data received and stored in said database.

12. The method of claim 9, wherein interactively generating graphical representations further comprises generating avatars having characteristics that change based on a change to the avatar's geographic position or altitude.

13. The method of claim 9, further comprising broadcasting said geographic representations on broadcast and cable television.

14. The method of claim 9, further comprising providing a datastream communicated over a wide area network.

15. The method of claim 9, further comprising;
receiving a time selection; and
updating said graphical representation in response to said time selection.

16. The method of claim 9, further comprising providing a presentation containing graphical representations of forecasted weather for said region of interest.

17. The method of claim 16, further comprising providing a time-lapsed presentation of graphical representations of weather information, wherein the weather information comprises past and forecasted conditions.

18. The method of claim 16, further comprising providing avatars having characteristics that change over time based on forecasted weather data in said database.

19. The method of claim 9, further comprising generating graphical representations of weather conditions in response to temporal characteristics, such that said weather data is dynamic over time.

20. The method of claim 9, wherein said database includes at least one of information about city, town, county and state boundaries or locations.

21. The method of claim 9, further comprising generating avatars which can display information from the said geographic information database based on the geographic position selected by the input system.

22. The method of claim 9, further comprising generating avatars which can be positioned geographically at the location selected by the input system.

23. The system of claim 1, further comprising one or more parameter inputs that are received in said database, wherein said data processor creates multiple, simultaneous queries in response to said geographic and parameter inputs.

24. The system of claim 1, wherein said graphical representations displayed on said visualization system change as a geographic position of said graphical representations changes.

25. The system of claim 1, wherein said graphical representations displayed on said visualization system substantially continuously change as said graphical representations are moved about said region of interest using said input system.

26. The system of claim 1, wherein said visualization system further comprises a display displaying said map of said geographic region of interest and said graphical representations; and wherein said displayed graphical representations dynamically change as said input system is manipulated by a user to move said graphical representations to different geographical positions over said geographical area of interest.

27. The system of claim 1,
wherein characteristics of said avatar dynamically change as said avatar changes geographic positions as said avatar is moved about said geographical region of interest.

28. The system of claim 27, wherein said avatar characteristics further comprise one or more of: content and graphical attributes representative of said geographically registered data; and wherein one or more of said content and said graphical attributes dynamically changes as a geographical position of said avatar changes.

29. The system of claim 2, providing dynamic presentations of geographic information for a region of interest comprising:

a datastream providing updated data to said database;
wherein visual characteristics of said graphical representations are updated in real time to reflect said updates to said data in said database for said received geographic inputs.

30. A system for providing random access, interactive presentations of geographic and temporal information for a region of interest, comprising:

a database that receives and stores geographically registered data;
an input system that interactively receives real time geographic inputs;
a data processor that dynamically creates a query of said geographically registered data in substantially real-time in response to receipt of said real time geographic inputs; and
a visualization system that generates graphical representations of said geographically registered data returned with results of said query for visual display, wherein said graphical representations of said results are displayed in substantially real-time;
a cursor that can be moved about said geographic region of interest using said input system; and
a map displaying said geographic region of interest;
wherein visual characteristics of said displayed graphical representations dynamically change in substantially real time in response to changes in a geographic position of said cursor in relation to said geographic region of interest,
wherein each said graphic representation can be moved around said map using said input system, wherein said graphic representation comprises a graphical representation of the weather for said geographic position of said graphic representation on said map,
wherein said graphical representation of the weather further comprises a weather parameter, wherein a visual characteristic of said displayed weather parameter dynamically changes as said geographic position of said displayed weather parameter is interactively dragged over said map.

31. The system of claim 1, wherein said graphical representations comprise said cursor, wherein said graphical representations are movable over said geographic region of inter- 32. The system of claim 1, wherein said graphical representations are stationary with respect to said geographic region of interest.

33. The system of claim 30, wherein said geographically registered data includes temporal characteristics, such that said data is dynamic over time, wherein visual characteristics of said displayed graphical representations are updated in real time to reflect said temporal characteristics of said geographically registered data in said database.

34. The system of claim 30, wherein said geographically registered data comprises at least one of gridded data, discreet position data, and geographic region data, and wherein a process is invoked on the data to retrieve said results.

35. The system of claim 30, wherein said input system further receives formatting inputs and a time selection, and wherein said formatting inputs include a representation input.

36. The system of claim 30, wherein said visualization system generates graphical representations of geographic information for display on broadcast and cable television.

37. The system of claim 30, wherein said graphical representations comprise avatars having characteristics that change over time based on data received in said database, and wherein the avatars change to updates of said data in real-time.

38. The system of claim 30, wherein said graphical representations comprise avatars having characteristics that change based on a change to the avatar's geographic position or altitude.

39. The system of claim 30, further comprising one or more parameter inputs that are received in said database, wherein said data processor creates multiple, simultaneous queries in response to said geographic and parameter inputs.

40. The system of claim 30, wherein said graphical representations displayed on said visualization system substantially continuously change as said graphical representations are moved about said region of interest using said input system.

41. A method for providing near real-time, random access, interactive presentation of weather information for a geographic region of interest, comprising:

receiving geographically registered weather data at a database;

randomly receiving a geographic position/region selection and a parameter selection;

formulating one or more queries of said geographically registered weather data in response to said selections;

interactively generating graphical representations of weather conditions for said region of interest in near real-time in response to results of said one or more queries;

displaying said graphical representations of weather conditions for said region of interest;

moving said graphical representations over said geographic region of interest using said input system; and dynamically changing a characteristic of said graphical representations based on a geographic position of said graphical representations, wherein visual characteristics of said displayed graphical representations dynamically change in substantially real time in response to changes in a geographic position of said graphical representations in relation to said geographic region of interest, wherein each said graphic representation comprises a graphical representation of the weather for said geographic position of said graphic representation on said map, wherein said graphical representation of the weather further comprises a weather parameter, wherein a visual characteristic of said displayed weather parameter dynamically changes as said geographic position of said displayed weather parameter is interactively dragged over said map.

* * * * *